Aug. 3, 1943.  G. A. KREB  2,325,861
FISHING REEL
Filed Aug. 8, 1941
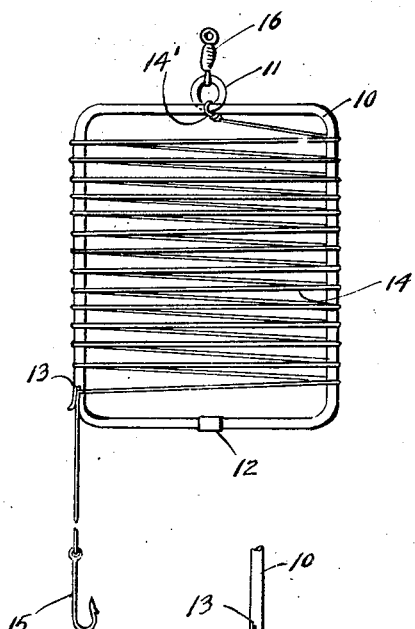
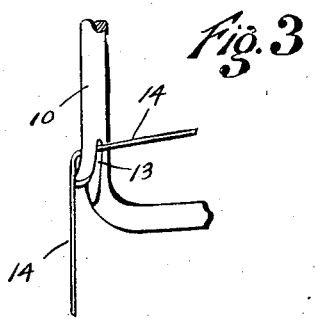
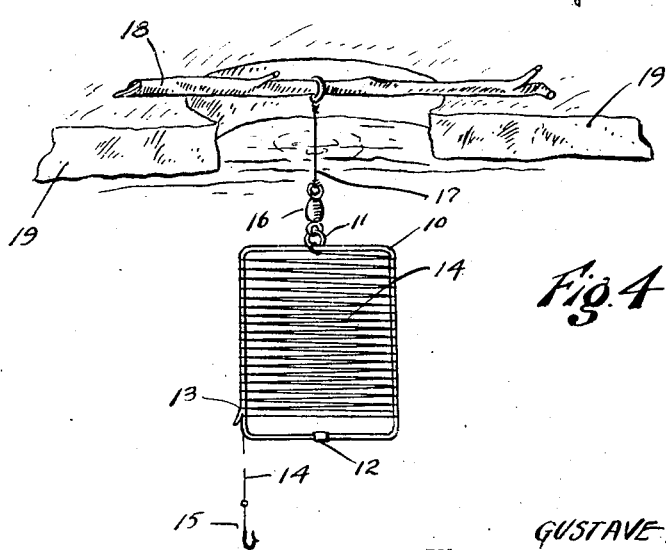
INVENTOR.
GUSTAVE A. KREB
BY Christian R. Nielsen
ATTORNEY.

Patented Aug. 3, 1943

2,325,861

UNITED STATES PATENT OFFICE 2,325,861

FISHING REEL

Gustave A. Kreb, Milwaukee, Wis.

Application August 8, 1941, Serial No. 406,057

3 Claims. (Cl. 43—20)

My invention relates to reels and more particularly to a type of reel in which a fish line is suspended in a coiled position while supporting the bait.

The object of my invention is to provide a reel for suspending a coiled fish line below the surface of the water thereby preventing the said line from freezing and breaking due to its rigid state when contacting sub-zero atmosphere.

Another object of my invention is to provide such a reel that will support the line and permit its being uncoiled by the revolving of the reel within the water, when the fish carries off the bait.

Still another object of my invention is to provide a form of line suspension that will revolve readily when the end of the line is disengaged from its clamping means.

Other and further objects of my invention will become more apparent as the description proceeds when taken in conjunction with the drawing in which Figure 1 is a side view of the assembled device, Figure 2 is a fragmentary perspective view of the line clamping means shown integrally formed within the body of the device, Figure 3 is a fragmentary perspective view of the clamping means showing the manner in which the line frictionally engages the device while supporting the bait, and Figure 4 is a perspective view of the device arranged for ice fishing.

Similar characters of reference indicate corresponding parts throughout the several views and referring now to the same the character 10 shows a wire frame bent to a square form. There is a loop member 11 shown integrally formed at the upper end of the frame, and the two ends of the wire constituting the frame 10 are shown joined at 12 by means of a welded joint, but they may be attached to one another in any other convenient manner such as by means of a sleeve or the like. Obviously the loop member 11 which is shown integrally formed at the upper end of the frame may be separately attached or may be swiveled at the point of attachment.

Nearer the lower end of one of the side members of the frame 10 is shown a slot 13 cut into the wire proper.

A fish line 14 fastened to the frame at 14' in the loop 11 is wound around the outer face of the side members of the frame 10 and the depending end of the line 14 is inserted into the slot 13, where it is retained by frictional contact as shown.

The extreme free end of the line 14 is shown supporting a hook 15 which hook is disposed for attachment of the bait. There is also an auxiliary swivel 16 fastened to a line 17 and the swivel 16 is shown engaging the loop member 11 of the frame 10. The line 17 may be attached to a pole not shown, or a cross member 18 as shown in Figure 4 when the device is employed for fishing through the ice.

In operation the device functions as follows when it is employed during the process of fishing through a hole in the ice of a lake or stream. A hole is first cut through the ice 19 as illustrated in Figure 4 and the entire device is suspended by means of the line 17 which is attached to a cross stick 18. It will be observed that the entire assembly of reel 10 and line 14 is suspended in a submerged position below the water line. The bait on the hook 15 may be supported any distance from the reel 10 depending on the length of line employed. The depending end of the line 14 which supports the hook, is suspended from the groove 13 on the frame 10 and the balance of the line 14 is wound around the outer edge of the frame 10 and attached at one end to the frame 10, in this case the loop 11.

When the fish contacts the bait 15 it will pull the line 14 from the slot 13 causing the entire device to revolve within the water, this free revolving action being permitted by the swivel 16 on the line 17. It is manifest to anyone familiar with the art that a wire frame having the fishing line wound around its outer edge in a manner to permit space between the line will offer very little resistance in the water during the revolving operation and will allow the fish to swim freely with the bait to a distance governed by the length of the fishing line.

While I have herein described a single embodiment of my invention and a manner of using same, I reserve the right to make such changes as may be deemed necessary and practical, without departing from the scope of the appended claims.

Having thus described my invention what I claim and desire to secure by Letters Patent in the United States is:

1. A device of the character described comprising a frame of rectangular shape, said frame being constructed of material having a small cross-sectional area, a swivel attached to the upper end of said frame, a slot cut into one of the side members of said frame, in combination with a fishing line attached at one end to the upper part of said frame, said fishing line being wound around the outer surface of said frame, a depending end of said fishing line being retained by means of frictional contact within said slot in said frame, said fishing line supporting a hook disposed for attachment of bait at its lower end.

2. A device of the character described comprising a rectangular frame, said frame being constructed of wire, said frame being supported at its upper end by means of a swivel member, the lower end of said frame being provided with a tapered groove, said groove being open at its lower end, in combination with a fishing line attached to the upper end of said frame, said line being wound around the outer edge of said frame, the depending end of said line being frictionally supported within the groove of said frame, said line being provided with a hook at its lower end for the support of a fishing lure.

3. A device of the character described comprising in combination a rectangular frame constructed of wire or the like, said frame being supported by means of a swivel at its upper end, said frame being provided with a tapered groove within one of its members at the lower end, said groove being open at its lower end, and a fish line attached at one of its ends to the upper end of said frame, said line being wound around the outer surface of said frame, the depending end of said line being frictionally suspended by means of the groove on the lower end of said frame.

GUSTAVE A. KREB.